United States Patent [19]
Krowech

[11] Patent Number: 5,989,302
[45] Date of Patent: *Nov. 23, 1999

[54] STEAM SEPARATOR INCLUDING AN INTERIOR BAFFLE WITH OPENINGS DEFINING STEAM PORTS AND A WATER FLOW SURFACE

[75] Inventor: Robert James Krowech, St. Louis Park, Minn.

[73] Assignee: DLTK, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,590

[22] Filed: Feb. 13, 1996

[51] Int. Cl.⁶ .................................................. B01D 45/08
[52] U.S. Cl. ..................... 55/424; 55/462; 55/DIG. 23; 122/491
[58] Field of Search ...................... 55/440, 462, DIG. 23, 55/424, 434, 394, 396; 95/267, 272; 122/491; 137/171

[56] References Cited

U.S. PATENT DOCUMENTS

| | | | |
|---|---|---|---|
| 2,675,888 | 4/1954 | Blizard et al. | 122/491 |
| 2,954,842 | 10/1960 | Coulter | 55/440 |
| 4,123,237 | 10/1978 | Zipay et al. | 55/434 |
| 4,182,277 | 1/1980 | Burton et al. | 122/491 |
| 4,263,025 | 4/1981 | Godare | 96/189 |
| 4,474,589 | 10/1984 | Smolensky | 55/337 |
| 4,483,696 | 11/1984 | Zipay et al. | 55/440 |
| 4,671,214 | 6/1987 | Alias et al. | 55/440 |
| 4,898,644 | 2/1990 | Van Horn | 55/440 |
| 4,947,485 | 8/1990 | Oosterkamp | 376/210 |
| 5,106,573 | 4/1992 | Fennern | 376/371 |
| 5,275,644 | 1/1994 | Teigen et al. | 96/190 |

OTHER PUBLICATIONS

Perry's Handbook of Chemical Engineering; Section 18–83 Figure 18–134, Section 18–89 Figure 18–149.; Fifth Edition 1973.

"Steam/Boiling and Steam Separation," publication date unknown, believed to be prior to the filing of the application, pp. 1–6 through 1–9.

*Primary Examiner*—David A. Simmons
*Assistant Examiner*—Robert A. Hopkins
*Attorney, Agent, or Firm*—Dorsey & Whitney LLP

[57] ABSTRACT

A steam separator achieves primary separation by directing the flow of a steam-water mixture against a baffle. The baffle redirects the flow so that the steam-water mixture is directed toward the surface of accumulated water ordinarily present in the separator. The liquid components of the steam-water mixture collect on the baffle and drip down into the accumulated water. The steam components pass around the edge of the baffle and escape upwardly. To improve the effectiveness of the separator, the edge of the baffle is extended below the water surface and openings or gables are formed in the baffle above the level of the water surface. The spaces between the gables provide a surface along which the separated liquid water component can flow undisturbed into the accumulated water, and the gables provide ports through which the steam component can escape from the baffle without reentraining significant amounts of the separated liquid water component.

29 Claims, 2 Drawing Sheets

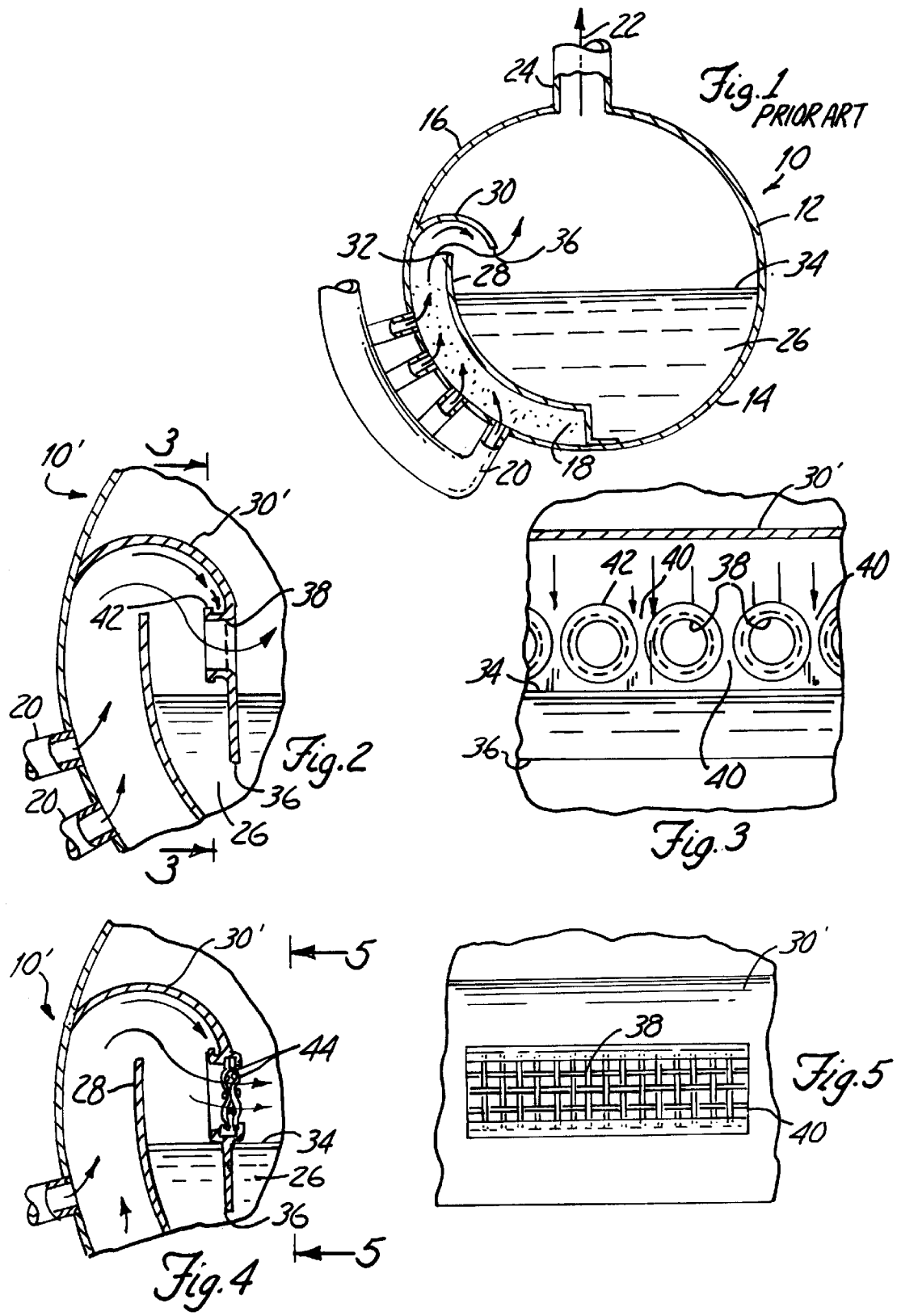

5,989,302

STEAM SEPARATOR INCLUDING AN INTERIOR BAFFLE WITH OPENINGS DEFINING STEAM PORTS AND A WATER FLOW SURFACE

BACKGROUND OF THE INVENTION

This invention relates generally to steam generating equipment and, more particularly, to steam separators for separating liquid water from gaseous steam in a steam-water mixture generated in such equipment.

Steam separators are well-known devices in the field of steam generating apparatus and equipment. Such separators receive a steam-water mixture generated in a boiler and function to separate liquid water components from gaseous steam components to ensure that only steam is delivered to a downstream device such as a steam turbine. Typically, steam separators are coupled to a boiler through steam-water risers. Flow is supplied to the steam separator in the form of a steam-water mixture. Steam separates from the water in the separator and is discharged through a steam outlet. Liquid water collected in the separator is returned to the boiler through one or more downcomers. "Primary" separation principally involves the removal of the bulk of the liquid water components from the steam. "Secondary" separation, or "steam scrubbing," involves removing most of the remaining water from the steam. Typically, both primary and secondary separation structures are included in a single steam separator.

Primary separation can be achieved mechanically in a number of ways, the simplest way being gravity separation. In gravity separation, the steam-water mixture is introduced into a closed vessel having an outlet at the top, and the inherent weight of the entrained liquid water causes the water to fall out of the steam flow. Although moderately effective, particularly at very low pressures and flow rates, gravity separation is largely ineffective at high pressures and flow rates. Gravity separation is also unsuitable in certain critical applications wherein it is important that liquid water be almost completely removed from the steam flow.

Primary separation can also be accomplished using various baffles or deflector plates that extend into the steam-water mixture flow and collect and channel the liquid water components away from the gaseous steam components. Such separation methods are far superior to simple gravity separation. In addition, they have the benefits of being relatively simple and inexpensive.

Still another way of achieving primary separation is through the use of centrifugal separators. In a typical centrifugal separator, the steam-water mixture is admitted tangentially into a cylindrical structure. Centrifugal force tends to drive the liquid components outwardly against the cylinder walls where they collect and drip down, while the gas components move toward the center where they collect and rise. Corrugated scrubbers near the upper end of the cylindrical structure further separate the liquid components from the gaseous ones. Although highly effective, centrifugal scrubbers are relatively complex and expensive.

In one form of primary mechanical separator, the effectiveness of centrifugal separation is largely combined with the simplicity and economy of baffle/deflector types of separators. In this form of separator, the steam-water mixture is introduced through the side of a cylindrical separator vessel below the level of the water ordinarily present in the vessel. An internal baffle near the vessel wall confines the steam-water mixture and causes it to flow upwardly along the interior side wall of the vessel. As the steam-water mixture breaks through the surface of the water, a curved deflector plate or baffle captures the flow and bends it back down toward the water surface. The resulting centripetal accelerations cause the liquid water components to accumulate along the curved baffle where they separate from the steam component and drip back down into the vessel. Although effective, such a separator requires that the steam pass through the "curtain" of water that drips off the end of the baffle. At high flow rates, this can reentrain some of the separated water, thereby reducing the overall effectiveness of the separator.

SUMMARY OF THE INVENTION

The invention provides a steam separator comprising a substantially cylindrical vessel having a lower sidewall and a plurality of steam-water risers opening into the vessel through the sidewall for admitting a steam-water mixture. A first interior baffle is provided within the vessel and spaced from the lower sidewall adjacent the steam-water risers for engaging the steam-water mixture entering the vessel and directing the steam-water mixture to flow upwardly within the vessel along the lower sidewall. A second interior baffle is positioned within the vessel above the first interior baffle so as to engage the steam-water mixture flowing upwardly along the lower sidewall and is shaped so as to redirect the upwardly flowing steam-water mixture inwardly and downwardly within the vessel. The second interior baffle includes a plurality of spaced openings that define a flow surface between the openings along which the water component of the steam-water mixture can flow. The openings permit steam to escape from the second interior baffle substantially without reentraining the water component of the steam-water mixture. A first feature includes the openings each having a lip forming a channel for directing water around the openings. A second feature includes the openings oriented to face the lower sidewall. A third feature involves the first and second interior baffles forming one continuous baffle between ends of the vessel.

The invention also provides a method of improving the separating effectiveness of a steam separator of the type having a horizontal, cylindrical vessel structure within the vessel for causing a steam-water mixture admitted to the vessel to flow upwardly adjacent the interior sidewall of the vessel, and a baffle within the vessel for engaging the steam-water mixture flow and redirecting the steam-water mixture flow back downwardly toward the surface of water ordinarily present in the vessel during normal operation. The method comprises the steps of (a) extending the baffle so that the baffle terminates below the surface of the water ordinarily present in the vessel, and (b) providing a plurality of spaced openings in the baffle at a level above the surface of the water ordinarily present in the vessel so that water accumulated by the baffle can flow downwardly along the baffle in the spaces between the openings while steam constrained by the baffle can escape outwardly from the baffle substantially without reentraining the water accumulated by the baffle.

It is an object of the present invention to provide a new and improved steam separator.

It is a further object of the present invention to provide a new and improved steam separator that is effective in removing the liquid water components from a steam-water mixture.

It is a further object of the present invention to improve the operation of a steam separator of the type wherein a baffle is used to redirect the flow of a steam-water mixture back down toward the surface of water ordinarily contained in the steam separator.

It is a further object of the invention to provide improvements in baffle-type steam separators that can be implemented easily, effectively and economically.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a sectional view of a prior art steam separator of the type having an internal baffle for upwardly directing a steam-water mixture in a containment vessel and further having a curved deflector plate for capturing the steam-water mixture and redirecting it downwardly in the vessel.

FIG. 2 is a fragmentary sectional view of an improved steam separator embodying various features of the invention including an extended, gabled deflector plate.

FIG. 3 is a cross-sectional view of the steam separator shown in FIG. 2 taken along line 3—3 thereof.

FIG. 4 is a fragmentary sectional view, similar to FIG. 2, of another embodiment of an improved steam separator wherein agglomerating structures are provided in the gables.

FIG. 5 is a cross-sectional view of the steam separator shown in FIG. 4 taken along line 5—5 thereof

DESCRIPTION OF THE PREFERRED EMBODIMENT

Figure 6:
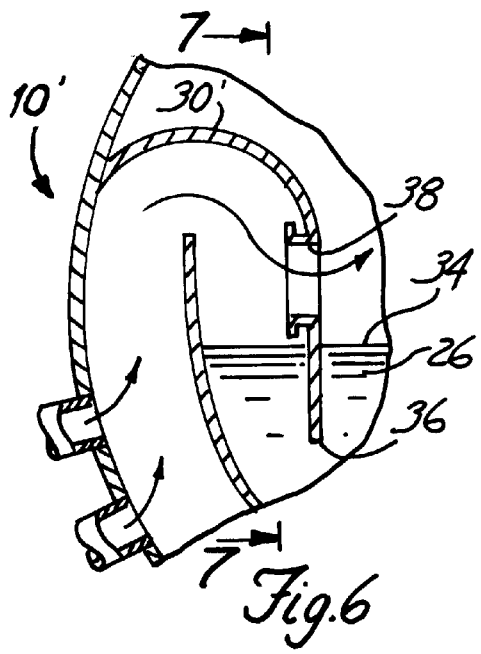
FIG. 6 is a fragmentary sectional view, similar to FIGS. 3 and 5, of still another embodiment of an improved steam separator.

Referring to the drawings, a prior art steam separator is shown at 10. The steam separator 10 includes a hollow, elongate, horizontal cylindrical vessel 12 that is preferably formed of steel or other durable metal. The vessel 12 is of substantially circular cross-section and includes a lower sidewall 14 and an upper sidewall 16. A steam-water mire 18 that is generated in a boiler or similar device (not shown) is introduced into the interior of the vessel 12 through a plurality of steam-water risers 20 that open into the vessel 12 through the lower sidewall 14. The steam separator 10 functions to separate the liquid water component of the steam-water mixture 18 from the gaseous steam component and to deliver a gaseous steam output 22 that is substantially free of liquid water droplets. The gaseous steam output 22 is delivered from the steam separator 10 through an outlet opening 24 in the upper sidewall 16 of the vessel 12. The separated liquid component of the steam-water mixture 18 remains behind in the form of accumulated water 26 that collects in the lower interior of the vessel 12. The accumulated water 26 is returned to the boiler in known manner through one or more downcomers (not shown).

In the prior art steam separator 10 shown in FIG. 1, primary separation is achieved through the use of cooperating first and second interior baffles, 28 and 30. The first interior baffle 28 is located within the interior of the vessel 12 adjacent and spaced from the risers 20. The first baffle 28 generally follows the curve of the lower sidewall 14 and engages the steam-water mixture 18 entering the vessel 12 through the risers 20. The first baffle 28 directs or channels the steam-water mixture 18 to flow upwardly in the vessel 12 along the lower sidewall 14. The upper end 32 of the first baffle 28 projects above the surface or level 34 of accumulated water 26 ordinarily present in the separator 10 during normal operation so that the steam-water mixture 18 introduced into the vessel 12 is initially directed upwardly past the upper end 32 of the first baffle 28.

The second interior baffle 30, which in the illustrated embodiment comprises an inverted, arcuate plate of substantially U-shaped cross-section, is positioned above the first interior baffle 28 so as to engage the steam-water mixture 18 that flows upwardly along the lower sidewall 14 and past the end 32 of the first baffle 28. The second baffle 30 redirects the upwardly flowing steam-water mixture stream so it flows downwardly and inwardly within the vessel 12. In the process of engaging and redirecting the steam-water mixture flow, the liquid water components of the steam-water mixture 18 tend to collect on the second baffle 30 where they coalesce to form larger droplets that flow along the underside of the second baffle 30 and drip down into the interior of the vessel 12 past the lower interior edge 36 of the second baffle 30. The steam component of the steam-water mixture 18, meanwhile, flows past the ends 32 and 36 of the first and second baffles 28 and 30 and upwardly toward the steam outlet 24. To further enhance separating effectiveness, a secondary separator (not shown) can be provided in the vessel 12 adjacent the steam outlet 24.

Preferably, the first and second baffles 28 and 30 are formed of steel or other durable metal and are welded into place in the vessel 12. It will be appreciated that the first and second baffles 28 and 30 comprise elongate structures that extend substantially the full length of the vessel 12.

Although generally effective, the primary separating structure of the prior art separator shown in FIG. 1 is not absolutely effective. It has been discovered that, during normal operation, liquid water that is collected by the second baffle 30 drips off the end 36 of the baffle 30 in a "curtain" of rain. The gaseous steam component, meanwhile, has to pass through this curtain before it can reach the steam outlet 24. As the flow rate of the steam-water mixture 18 into the vessel 12 increases, both the amount of water dripping off the second baffle 30 and the speed of the steam passing through the water increase. At sufficiently high flow rates, the gaseous steam can reentrain some of the separated water as the steam passes through the water "curtain" and can carry the reentrained water up toward, and out of, the steam outlet 24. The invention is directed toward improving the separating effectiveness of the type of primary separator shown in FIG. 1 and provides both structures and methods for so improving such separating effectiveness.

One embodiment of an improved steam separator embodying various features of the invention is shown in FIGS. 2 and 3. In the embodiment shown, the separator 10' differs from the prior art separator 10 in the structure of the second baffle 30'. The vessel 12, steam risers 20 and first baffle 28 can remain unchanged or can be modified, if desired, without departing from the invention in its broader aspects. In the improved separator 10', the lower interior edge 36 of the second baffle 30' is extended downwardly so as to terminate below the normal operating water level 34 of the separator 10'. In addition, a plurality of spaced openings or gables 38 are formed in the second baffle 30' preferably near, but nevertheless above, the normal operating water level 34. The openings 38 define ports through which the gaseous steam component of the steam-water mixture can escape from the second baffle 30'. In addition, the areas or spaces 40 between the openings 38 provide continuous, unbroken surfaces along which the liquid water component of the steam-water mixture accumulated by the second baffle 30' can flow smoothly and uninterrupted into the accumulated water 26. This substantially reduces or eliminates the probability of reentraining the collected liquid water component in the steam flow. In particular, the steam flow can escape from the second baffle 30' without crossing the flow of the accumulated water component, which flows substantially unimpeded along the spaces 40 between the openings 38 and into the accumulated water 26.

To further reduce the likelihood of reentraining the liquid water component, and thereby further improve the separating effectiveness of the improved separator 10', a lip 42 can be formed around each of the openings 38 as best seen in FIG. 2. The lip 42 forms a barrier that directs the liquid water accumulated by the second barrier 30' around the openings 38. The water thus flows around the openings 38 rather than across them as might occur in the absence of the barrier 42. By thus avoiding having the water drip across the face of the openings 38, the likelihood of reentraining the water component is reduced.

Another embodiment of the improved separator 10' is shown in FIGS. 4 and 5. In this embodiment, agglomerating structures are provided within the openings 38 for collecting and retaining any liquid water component that might still be entrained in the steam passing through the openings 38. In the illustrated embodiment, the agglomerating structures take the form of a wire screen or mesh 44 mounted in or over the openings 38. Liquid water components attempting to pass through the openings 38 are intercepted by the mesh 42 and flow along the mesh 44 and back down the second baffle 30' into the accumulated water 26.

Figure 7:
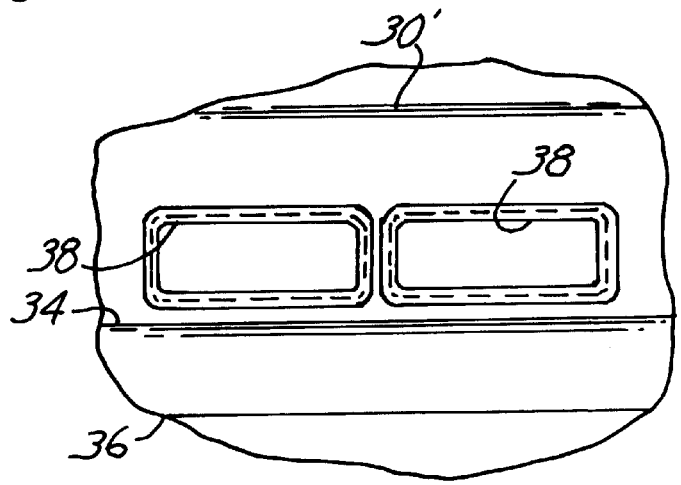
FIG. 7 is a cross-sectional view of the steam separator shown in FIG. 6 taken along line 7—7 thereof and showing an alternate gable shape.
Figure 8:
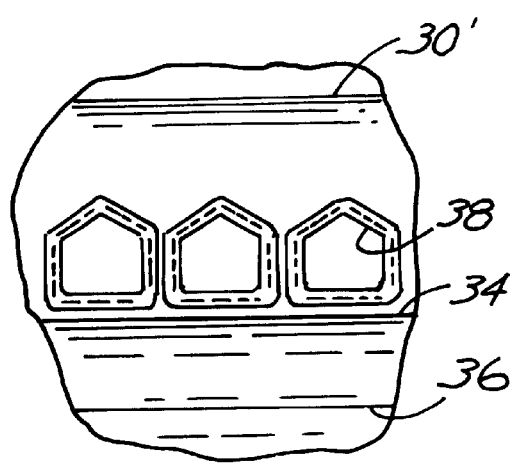
FIG. 8 is a sectional view, similar to FIG. 7, showing still another alternate gable shape.

Still other embodiments of the improved separator 10' are shown in FIGS. 6, 7 and 8. In these embodiments, the shapes of the openings 38, which are generally not critical, are changed. In addition to the round openings 38 shown in FIGS. 2 and 3, the openings 38' and 38" shown in FIGS. 7 and 8, respectively, can be rectangular or house-shaped as well. Still other shapes are possible. In general, the precise shape selected will be determined on the basis of combined considerations of maximum desired steam flow, avoidance of water flow across the openings and considerations of manufacturing economy.

It will be appreciated that the lips 42 and the meshes 44 can be used or not used in any combination and in conjunction with a variety of shapes of openings. It will also be appreciated that the precise shape, size and configuration of the separating vessel 12 is not critical, nor are the precise shape, configuration and location of the first and second baffles 28 and 30' so long as they cooperate and function substantially as herein described. Finally, the precise materials used in the improved separator, as well as how they are formed and assembled, is not critical to the invention in its broader aspects.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. A steam separator, comprising:
a substantially cylindrical vessel having a lower sidewall;
a plurality of steam-water risers opening into the vessel through the sidewall for admitting into the vessel a steam-water mixture;
a first interior baffle within the vessel spaced from the lower sidewall adjacent the steam-water risers for engaging the steam-water mixture entering the vessel through the steam-water risers and directing the steam-water mixture to flow upwardly within the vessel along the lower sidewall; and
a second interior baffle within the vessel positioned above the first interior baffle so as to engage the steam-water mixture flowing upwardly and shaped to redirect the upwardly flowing steam-water mixture inwardly and downwardly within the vessel, the second interior baffle including a plurality of spaced openings that permit steam to escape from the second interior baffle substantially without reentraining the water component of the steam-water mixture,
wherein each of the spaced openings includes a lip extending toward the lower sidewall and away from the opening to form a channel for directing water around the opening.

2. The steam separator of claim 1 wherein the second interior baffle that defines the openings includes a lower interior edge that terminates below the surface of a water level that is maintained in a lower interior portion of the vessel.

3. The steam separator of claim 1 wherein the second interior baffle includes an elongate arcuate plate of substantially U-shaped cross-section.

4. The steam separator of claim 3 wherein the second interior baffle is mounted substantially parallel with a longitudinal axis of the vessel with first and second ends of the U-shaped cross-section lowermost and a closed end portion of the U-shaped cross-section uppermost, and the second interior baffle extending outwardly from the lower sidewall.

5. The steam separator of claim 1, further including an agglomerating structure in each of the openings for coalescing liquid water components passing through the openings.

6. The steam separator of claim 1, further including wire mesh mounted across each of the openings.

7. The steam separator of claim 1 wherein the second interior baffle includes circular-shaped openings for the plurality of spaced openings.

8. The steam separator of claim 1 wherein the second interior baffle includes rectangular-shaped openings for the plurality of spaced openings.

9. The steam separator of claim 1 wherein the second interior baffle includes pentagonal-shaped openings for the plurality of spaced openings.

10. The steam separator of claim 1 wherein the lip has a curved shape.

11. The steam separator of claim 1 wherein the lip has a first portion extending substantially perpendicular to the second interior baffle and a second portion extending substantially parallel to the second interior baffle.

12. A steam separator, comprising:
a substantially cylindrical vessel having a lower sidewall;
a plurality of steam-water risers opening into the vessel through the sidewall for admitting into the vessel a steam-water mixture;
a first interior baffle within the vessel spaced from and located substantially parallel to the lower sidewall adjacent the steam-water risers for engaging the steam-water mixture entering the vessel through the steam-water risers and directing the steam-water mixture to flow upwardly within the vessel along the lower sidewall; and a second interior baffle within the vessel positioned above and substantially parallel to the first interior baffle so as to engage the steam-water mixture flowing upwardly along the lower sidewall and shaped to redirect the upwardly flowing steam-water mixture inwardly and downwardly within the vessel, the second interior baffle including a plurality of spaced openings, facing the lower side wall, that define a flow surface between the openings along which the water component of the steam-water mixture can flow and that permit steam to escape from the second interior baffle substantially without reentraining the water component of the steam-water mixture.

13. The steam separator of claim 12 wherein the second interior baffle that defines the openings includes a lower interior edge that terminates below the surface of a water level that is maintained in a lower interior portion of the vessel.

14. The steam separator of claim 12 wherein the second interior baffle includes an elongate arcuate plate of substantially U-shaped cross-section.

15. The steam separator of claim 14 wherein the second interior baffle is mounted substantially parallel with a longitudinal axis of the vessel with first and second ends of the U-shaped cross-section lowermost and a closed end portion of the U-shaped cross-section uppermost, and the second interior baffle extending outwardly from the lower sidewall.

16. The steam separator of claim 12, further including an agglomerating structure in each of the openings for coalescing liquid water components passing through the openings.

17. The steam separator of claim 12, further including wire mesh mounted across each of the openings.

18. The steam separator of claim 12 wherein the second interior baffle includes circular-shaped openings for the plurality of spaced openings.

19. The steam separator of claim 12 wherein the second interior baffle includes rectangular-shaped openings for the plurality of spaced openings.

20. The steam separator of claim 12 wherein the second interior baffle includes pentagonal-shaped openings for the plurality of spaced openings.

21. A steam separator, comprising:
a substantially cylindrical vessel having a lower sidewall and having first and second ends;
a plurality of steam-water risers opening into the vessel through the sidewall for admitting into the vessel a steam-water mixture;

a first interior baffle within the vessel spaced from the lower sidewall adjacent the steam-water risers for engaging the steam-water mixture entering the vessel through the steam-water risers and directing the steam-water mixture to flow upwardly within the vessel along the lower sidewall; and a second interior baffle within the vessel positioned above the first interior baffle so as to engage the steam-water mixture flowing upwardly along the lower sidewall and shaped to redirect the upwardly flowing steam-water mixture inwardly and downwardly within the vessel, the second interior baffle including a plurality of spaced openings, facing the lower side wall, that define a flow surface between the openings along which the water component of the steam-water mixture can flow and that permit steam to escape from the second interior baffle substantially without reentraining the water component of the steam-water mixture, wherein the first interior baffle and second interior baffle are arranged as a single, continuous baffle between the first and second ends of the vessel.

22. The steam separator of claim 21 wherein the second interior baffle that defines the openings includes a lower interior edge that terminates below the surface of a water level that is maintained in a lower interior portion of the vessel.

23. The steam separator of claim 21 wherein the second interior baffle includes an elongate arcuate plate of substantially U-shaped cross-section.

24. The steam separator of claim 23 wherein the second interior baffle is mounted substantially parallel with a longitudinal axis of the vessel with first and second ends of the U-shaped cross-section lowermost and a closed end portion of the U-shaped cross-section uppermost, and the second interior baffle extending outwardly from the lower sidewall.

25. The steam separator of claim 21, further including an agglomerating structure in each of the openings for coalescing liquid water components passing through the openings.

26. The steam separator of claim 21, further including wire mesh mounted across each of the openings.

27. The steam separator of claim 21 wherein the second interior baffle includes circular-shaped openings for the plurality of spaced openings.

28. The steam separator of claim 21 wherein the second interior baffle includes rectangular-shaped openings for the plurality of spaced openings.

29. The steam separator of claim 21 wherein the second interior baffle includes pentagonal-shaped openings for the plurality of spaced openings.

* * * * *

UNITED STATES PATENT AND TRADEMARK OFFICE
CERTIFICATE OF CORRECTION

PATENT NO.   :   5,989,302
DATE         :   November 23, 1999
INVENTORS    :   Robert J. Krowech It is hereby certified that error appears in the above-identified patent and that said Letters Patent are hereby corrected as shown below:

|  | Reads | Should Be |
|---|---|---|
| Column 3, line 49 | "mire" | -- mixture -- |

Signed and Sealed this

Twenty-second Day of May, 2001

Attest:

NICHOLAS P. GODICI

*Attesting Officer*   *Acting Director of the United States Patent and Trademark Office*